Sept. 24, 1935.  J. E. LILIENFELD  2,015,484
METHOD OF EFFECTING METAL GLAZED REFRACTORY INSULATOR
JOINT AND JOINTS RESULTING THEREFROM
Filed June 29, 1932
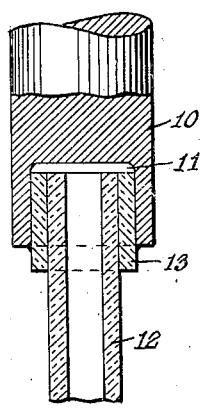
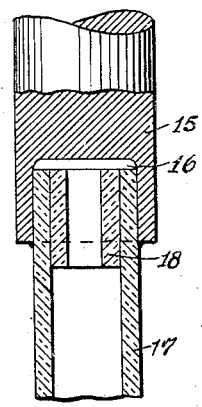
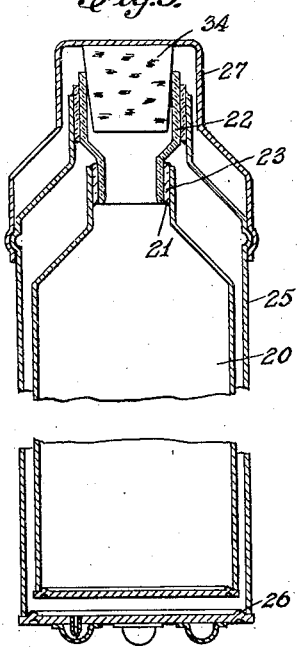
INVENTOR
JULIUS EDGAR LILIENFELD
BY
ATTORNEY Patented Sept. 24, 1935

2,015,484

UNITED STATES PATENT OFFICE 2,015,484

METHOD OF EFFECTING METAL-GLAZED-REFRACTORY INSULATOR JOINT AND JOINTS RESULTING THEREFROM

Julius Edgar Lilienfeld, Winchester, Mass., assignor to Ergon Research Laboratories, Inc., Malden, Mass., a corporation of Delaware Application June 29, 1932, Serial No. 620,052

10 Claims. (Cl. 49—81)

The invention relates to a method of effecting a joint between non-metallic refractory materials and certain metals through the interposition of an intermediate glazing or layer of glass having a small coefficient of expansion and preferably also of a high melting point in the range of the melting point of the metal; also, to the novel joint resulting therefrom.

In the construction of pressure-sealed vessels, and particularly such as are associated with cathodic discharges, a selection of the materials utilized in the construction of such apparatus must conform to certain requirements, for example, it must be possible to effect therewith a gas-tight joint and it must be possible, also, to de-gas the same in order to allow of sufficient evacuation of the vessel. Moreover, they must not be of a nature to give off gases under the impact of electrons and ions or as a result of any heating of the material occurring during operation of the apparatus.

While the invention has several objects, which will become apparent in the following description thereof, it has for its particular objects to afford a method for effecting a weld which will possess the characteristics hereinbefore noted; also, the provision of a joint between a metal such as aluminum—having a component sufficiently electropositive to react with a silicious component of the refractory—and a refractory such as porcelain, the said joint remaining leak-proof under high pressures as well as when subjected to conditions such as prevail in highly evacuated vacuum tube apparatus of the nature hereinbefore noted.

The invention has for a further object the provision of a joint of the aforesaid nature wherein the fitting composing the same may have a reasonably large tolerance in the clearance between the metal and the refractory, as in case the metal parts are not accurately machined; also, the provision of aluminum as a material for constituting the main housing of evacuated apparatus such as X-ray tubes, cathode-discharge tubes, Dewar flasks and like vessels; and the provision of a layer of glazing intermediate the refractory proper and the aluminum whereby the refractory will be glazed or coated with a shell, that may be relatively thin, of the intermediate material and to which shell the aluminum is welded. This admits of the use of a refractory, such as porcelain, which ordinarily will evolve gases upon bombardment with stray electrons, etc. as well as upon intense heating.

In some cases the use of a heavy layer of the glaze would be of especial advantage in the construction of the novel joint. However, it is a very difficult matter to secure such heavy glaze by the usual methods of glazing; and porcelain glazed by any of the present methods presents a pitted appearance at many points because actually the glaze does not uniformly cover the porcelain. Such heavy glaze may be obtained, however, by the novel method of interposing a layer of well known types of borosilicate glass. This not only insures a non-pitted uniform layer, preventing the gassing of the porcelain into the vessel sealed by the joint, but also presents an advantage in the mechanical handling of the parts to be joined in the sealing process. That is to say, relatively loosely fitting parts may be used since the glass layer is viscous at the welding temperature and fills out any free spaces.

Still another object of the invention resides in the novel method of welding aluminum to a glass, becoming viscous at the temperature at which the aluminum is melted, by providing a refractory support for the glass when in its viscous condition.

I have found that certain metals having a component sufficiently electropositive to react with a silicious component of the refractory may be welded to the refractory to accomplish the above objects and more especially when there is interposed a glazed surface which enters into molecular contact with both the metal and the refractory. Such metals as aluminum and magnesium may, under certain conditions, be caused to thus react with the refractory or glazing to provide a layer between the metal and the refractory which is in molecular contact with both and affords a true welded joint therebetween.

Joints of this nature may find use in many different applications, both as mechanical supports or connections for insulating refractories and joints that are liquid- and/or gas-tight, as for sealing off containers. These welded joints may be utilized, for example, in the suspension of insulating bases for high-voltage equipment or terminals for oil-filled transformers and condensers, terminals for pressure-gas-filled tanks containing transformers, condensers, switches, lightning arresters, etc.; electrodes of electrolytic condensers, resistors, spark plugs, refractory seals and similar devices; also, and particularly, in connection with high-vacuum apparatus, such as Dewar flasks, X-ray tubes and other vacuum discharge devices; mercury-filled devices operated both in vacuum and/or high-pressure, such as mercury toggle switches, mercury rectifiers, mercury lamps, etc.

In attaining the above objects, a welded joint is secured as, for example between aluminum and porcelain, in the manner hereinafter more fully set forth and in which the aluminum, or magnesium, is of such plasticity and expansivity that it will stand up under the heating and subsequent cooling of the welding operation without destroying the refractory material or the joint.

It is to be noted that genuinely sealed joints between silicious insulators and metals having different coefficients of expansion have heretofore been founded upon an entirely different physical basis than that herein disclosed. Thus, it has been the practice to join the molten insulator to the solid metal, whereas in accordance with the present invention, the metal is applied in molten condition to a silicious refractory. Moreover, the difference in expansion was compensated for in the seals of the prior art by utilizing very thin metal, the seal being mostly between a metal wall of greatly reduced thickness and the silicious insulator whereby the difference of expansion between metal and insulator was accommodated by the inherent elasticity of the metal itself.

For this reason, these seals were mechanically vulnerable, due to the extreme thinness of the metal at the sealing portion.

In contradistinction to the prior art and in carrying out the present invention, a welded joint between the metal in a molten condition and a silicious refractory is provided, the expansion differences being accommodated by the inherent plasticity of the metal, rather than by shaping the metal so as to rely upon its elasticity, and such that the plastic metal will conform to the stresses induced by reason of the difference between the coefficients of expansion of the metal and the refractory; and thus, by virtue of so conforming, will prevent fracture of the refractory and/or prevent separation of said refractory from the metal in securing a molecular contact therebetween. For this reason, a substantial mass of metal at the weld may be obtained and a rugged joint is secured and may be of such a nature, furthermore, as to be maintained at elevated temperatures.

A further novel characteristic of the joint resides in the fact that the temperature of the refractory during the welding action is such as to exceed the melting temperature of the heated metal to be welded thereto by an amount sufficient to attain the reaction between the metal and the refractory, resulting in the formation of a silicized transition layer. It is to be noted that without such a reaction, a sweated joint rather than a weld would result, which sweated joint could not have the required qualities of mechanical strength and/or tightness, especially not at an elevated temperature.

In carrying out the invention, the joint is effected between a silicious insulating refractory, such as porcelain, preferably vitrified and with surface glazed or unglazed, and the aluminum by interposing a thin glaze or a shell of glass, for example, well known types of borosilicate glass. In the production of the joint, the glass is first coated over the porcelain to a thickness of say 1 mm. or more. This can readily be effected by heating a suitable porcelain, such as "Sillimanite", with a blow torch and applying the glass layer thereto and heating until it welds to the porcelain.

As a glass of the characteristics of a borosilicate glass will withstand the strains of the subsequent process, the porcelain thus coated may be heated, without exercising particular precautions, by the application of the flame of a torch thereto. Furthermore, the heating may be extended to produce a bright yellow glow without causing the softened but still sufficiently viscous glass layer to flow off the underlying porcelain support.

Notwithstanding the fact that the glass melts at a much lower temperature than the porcelain, it still retains sufficient viscosity to maintain substantially its shape thereon and with this underlying support it is possible to weld the aluminum to the glass which, otherwise, would not be feasible in view of the relatively low melting point of such glass. Moreover, in the use of an intermediate coating of this nature, and especially when utilized in apparatus of larger sizes, it is possible to utilize aluminum fittings with a greater amount of tolerance in the clearance between the aluminum and the insulator body with which a joint is to be effected.

In the accompanying drawing which illustrates several embodiments of the invention:

Fig. 1 is a front elevation and part vertical section illustrating the novel method of securing a porcelain tube, for example, to an aluminum rod or electrode.

Fig. 2 is a similar view illustrating the method of welding an aluminum rod or electrode to a glass tube.

Fig. 3 is a vertical section illustrating the application of the novel joint to the construction of a Dewar flask.

In the provision of these joints between a silicious refractory, such as porcelain, and a metal, such as aluminum, having a component sufficiently electropositive to react with a silicious component of the refractory in the manner hereinafter set forth to produce a weld, it is to be noted that by the term "weld" or "welded" as applied to the joint herein described and referred to in the claims, I wish to be understood as having reference to the direct consolidation of the two solid bodies—metal and refractory—to the extent of molecular cohesion by fusion at their junction.

Furthermore, as aluminum of different grades of purity is suitable for effecting the novel joint, the characteristics of the joint being determined to a large degree by the particular grade of aluminum utilized, I desire, further, to define the word "aluminum" as herein used to include not only substantially pure aluminum but also various suitable alloys of aluminum with other metals.

For example, an alloy of aluminum with 1.25% of manganese; an alloy of aluminum 1.25% of manganese and 1% of magnesium; an alloy of aluminum with 8% of copper, 12½% of silicon and 1.15% of magnesium; an alloy of aluminum with 5% of silicon; an alloy of aluminum with 5% silicon, 1.2% copper, and .5% of magnesium; an alloy of aluminum with 7% silicon and 0.3% of magnesium; an alloy of aluminum with 0.8% of nickel, 0.4% of iron, and 0.1% of titanium, has been found to afford satisfactory welds under certain conditions.

Also, the term "pure aluminum" as utilized herein is to be understood as referring to aluminum containing 99% or better of aluminum and such as is normally produced in the well-known reduction methods for obtaining aluminum from its ores, while the term "high purity" aluminum is intended to refer to the preferred form of aluminum and containing approximately 99.6% or more of aluminum.

In connection with the degree of purity of the pure aluminum, it is to be noted that the amount of impurities ordinarily present in the aluminum has a deleterious effect on the favorable combination of plasticity and expansivity and that the higher the degree of purity of the aluminum, the greater its plasticity characteristic.

Certain alloys of aluminum compounded so as to make them undesirable for use in the novel welding process in this respect do not possess the high degree of plasticity required for effecting, for example, a joint which will be gas-tight on repeated heating and cooling, yet are of such a nature as to afford a suitable joint where these rigid requirements are not met with. By this I do not wish to necessarily imply that the weld per se is not perfect and a molecular cohesion not attained, but rather that there may be isolated areas in which no such contact exists and that therefore these portions might leak.

Other alloys are compounded unfavorably so as to become "hot short" as a result of the heating; and a joint effected therewith develops a certain degree of porosity, although the joint may be perfectly satisfactory in a mechanical respect and having certain useful applications, as where the retention of gas or liquid is not an important item, or in instances where the joint is not to be subsequently subjected to elevated temperatures.

Particularly in the case of pure aluminum and certain aluminum alloys such as aluminum with 1.25% of manganese, and aluminum with 1.25% of manganese and 1% of magnesium, is it possible to effect a joint that is gas-tight and/or one which will not fail under repeated heating and cooling.

Where a joint of the very best characteristics is desired, however, high purity aluminum has been found to be the metal best suited for this purpose.

The particular grade of aluminum required in connection with the production of a joint between the same and the selected refractory and if the desired characteristic is that of perfect gas-tightness, may readily be determined, e. g., welding a threaded aluminum fitting to a tube of the refractory closed on one end, and by connecting said fitting to a gas pressure tank of, say, 250 lb. pressure or to a vacuum system, and by observing the pressure or absence of a leak first at room temperature and second at a more elevated temperature which may in some cases be 80° C., and in other cases run up as high as 300° C. or even higher.

In carrying out the method for providing the welded joint between a silicious refractory and a metal, an intermediate transition layer of the silicized metal is formed which provides molecular contact between the said metal and the said refractory, the reaction between the metal and the refractory being direct. This is best effected by heating the refractory at the area to be welded to a temperature greatly exceeding the melting temperature of the metal, as to a yellow heat and approximating 1100° C., which temperature will insure the aforesaid reaction desired. The aluminum is also heated and then placed in contact with the refractory whereby the temperature of the aluminum is elevated, either by further external heating or from the accumulated heat from the refractory, or both, to an intense degree such as to cause the said aluminum to flow in melting over the silicious component of the refractory to react with it.

In effecting the weld, it is desirable to coat the aluminum prior to its contact with the heated refractory with a substance which will not dissolve the oxide skin upon the aluminum to a detrimental degree and which has a tendency rather to protect the aluminum from oxidizing too deeply, and to provide an envelope for supporting the metal in a molten state even if heated considerably above its melting point.

This envelope should be of a flexible character and I have found that a layer of molten borax is particularly suitable for this purpose, being when molten viscous enough to adhere to the aluminum and at the same time is sufficiently liquid to allow the aluminum which, in this case, is heated above its melting point, to adjust itself to the contour of the refractory.

Furthermore, the borax probably facilitates the reaction between the aluminum and the refractory, as it will run in its molten condition the freest at the tip where the aluminum is the thinnest and hottest, and thus causes the aluminum to be released at this point and make it flow freely, resulting in the aluminum "wetting" the surface of the refractory to effect a molecular contact therewith.

Other agents suitable for this purpose are boric acid, boric oxide, sodium silicate, and ground glass retained by a suitable combustible vehicle or binder such as collodion.

The action of these agents is therefore quite different from that of an ordinary flux in welding one metal to another, and wherein it serves to dissolve the skin, for example oxide, forming on the metal and thus causing the latter to flow irregularly in all directions, in the absence of any envelope to restrain it. Such action would be entirely unsuitable in the present instance.

In contradistinction to the usual method of effecting a joint between a metal and a refractory, I cause the metal to melt while the underlying refractory remains in its solid phase, and, moreover, is heated to a temperature far above the melting point of the metal which is to be welded thereto, the particular temperature required being that necessary to attain the reaction between the electropositive component of the metal and the silicious component of the refractory or glaze. Furthermore, the enveloping agent utilized is of such a nature as to attain a more or less liquid state at the welding area though adhering to the metal in a molten condition and serving to restrain it from undue dispersion over the refractory.

As a particularly satisfactory refractory in the production of these joints, porcelain may be utilized, especially that variety known as "Sillimanite"; also, quartz, glass, especially the form known as borosilicate glass, as well as other silicates. The refractory is preferably utilized in cylindrical form as bushings, tubes, rods, etc.; and the area to be welded is preferably, though not necessarily, first glazed as by a fluoride or borax glazing.

Referring to the drawing, 10 designates an aluminum, or magnesium, rod, electrode or the like which is provided with the recess 11 at its one end and at which it is adapted to be welded to a refractory tube 12 as of porcelain or other silicious refractory material having insulating properties.

In accordance with the invention, the weld is to be effected between said metal and the refractory through the interposition of a glazed surface, or preferably a layer of glass which, in the present instance, is indicated as a ring 13, for example, of borosilicate glass. The ring 13 is eventually to be seated within the recess 14, and the one end of the tube 12 is first fitted within said ring, the wall of which latter may have a thickness of approximately 1 mm. The porcelain tube with ring surrounding its one end is then heated to a relatively high temperature, for example to a yellow heat or approximately 1100° C. and which is appreciably above the melting point of the borosilicate glass ring.

At the temperature required for the reaction between the glass and the aluminum, the former would ordinarily flow to such an extent that it is impossible to control the shape thereof. However, by reinforcing or supporting it with the porcelain tube, as set forth, it is possible to substantially maintain the form of a ring, notwithstanding the fact that the heating is extended to a bright yellow glow, as the glass retains sufficient viscosity to maintain its shape on the porcelain core.

This makes it possible to apply the recessed end of the metal rod 10 which has been preheated, over the highly heated porcelain coated with glass ring and to effect a perfectly satisfactory weld between the glass and the metal and the glass and the refractory, the heat for effecting the weld being derived either from the excess heat of said refractory or by applying external heat.

Fig. 2 shows a further development of this feature of supporting an ordinarily too-fusible material by means of a supporting member of relatively high melting point. Thus, the rod, electrode or the like 15 of metal such as aluminum, is similarly provided with a recess 16 and is adapted to be welded to a suitable glass tube or the like 17, as of borosilicate glass. This material, of course, could not ordinarily be heated to the degree necessary to effect the reaction for a weld between it and the metal. However, by inserting within its inner end over the area where the welded joint is to be made a refractory ring 18 of porcelain or the like, the reinforced end of the glass tube may be heated together with the annular insert to a degree sufficient to provide first a perfectly satisfactory weld of the insert to the glass tube and then between the metal and the said glass tube. Of course, other refractory materials such as carbon which will not adhere to the glass may be substituted for the insert 18 where it is desired to dispense with the underlying support member after the weld between the aluminum and glass has been effected.

Joints of the nature aforesaid may be of particular value in highly evacuated apparatus, such as X-ray tubes, Dewar flasks and the like; and in Fig. 3 the application of the same to a Dewar flask is disclosed.

In this embodiment, the container 20 is wholly of aluminum and the neck of the same is sealed as at 21 to a refractory or porcelain mouth-element 22, through the interposition of a coating or sleeve 23 of glass such as borosilicate glass. A stopper or cork 24 is designed to fit the mouth in the usual manner to seal the contents of said container.

The enclosing shell 25 for the vacuum chamber, formed between said shell and the container 20, is made of aluminum and in two parts in order to admit of the insertion of the aforesaid container, and at its upper end is welded to the neck member or mouth element 22 at an area displaced from the portion at which the container 20 is welded. The shell 25 may then be closed at the bottom, or in any convenient manner, as by welding thereto the cast or forged base 26 of aluminum. A cap 27 of metal (aluminum) fits over the other end of the flask and is designed to have, for example, a bayonet fit therewith.

I claim:

1. The method of effecting a welded joint between aluminum and a silicious insulating refractory, which includes glazing the refractory, then welding the aluminum to the glazed coating by heating the glazed refractory to a temperature greatly exceeding the melting temperature of the aluminum, applying to the exterior surface of the metal area to be welded an envelope producing agent, heating the aluminum and placing it in contact with the refractory, and raising the temperature of the aluminum to flow it upon the highly heated refractory.

2. The method of effecting a welded joint between aluminum and a silicious insulating refractory, which includes glazing the refractory, then welding the aluminum to the glazed coating by heating the glazed refractory to a temperature greatly exceeding the melting temperature of the aluminum, applying to the exterior surface of the metal area to be welded an envelope-producing agent sufficiently viscous to adhere to the aluminum when heated, heating the aluminum and placing it in contact with the glazed portion of the refractory, and raising the temperature of the aluminum to flow it upon the highly heated refractory.

3. In the welding of aluminum to a glass member by applying the aluminum thereto in a solid phase for melting at a temperature at which the glass becomes viscous: the step which comprises supporting the glass member during the welding period solely by a material more refractory than the glass and at a temperature substantially in excess of that required to melt both the aluminum and the glass.

4. In the welding of aluminum to a glass member having a small coefficient of expansion by applying the aluminum thereto in a solid phase for melting at a temperature at which the glass becomes viscous: the steps which comprise supporting the glass member during the welding period solely by a material more refractory than the glass, and maintaining said supporting material during the welding period at a temperature in excess of that of said glass.

5. In the welding of aluminum to a glass member by applying the aluminum thereto in a solid phase for melting at a temperature at which the glass becomes viscous: the step which comprises supporting a borosilicate glass member during the welding period solely by a porcelain member at a temperature substantially in excess of that required to melt both the glass and the aluminum and whereby said glass becomes welded both to the aluminum and to the porcelain.

6. In the welding of aluminum to a glass member by applying the aluminum thereto in a solid phase for melting at a temperature at which the glass becomes viscous: the step which comprises supporting the glass member solely by a carbon member at a temperature substantially in excess of that required to melt both the aluminum and the glass, and whereby after the latter has been welded to the aluminum the carbon member may subsequently be withdrawn.

7. The method of welding aluminum to a preformed glass member, which comprises associating said member with the aluminum, and supporting both upon a member more refractory than both the glass and the aluminum and at a temperature substantially in excess of that required to melt them.

8. The method of welding aluminum to a preformed glass member, which comprises associating said member with the aluminum, and supporting both upon a member more refractory than both the glass and the aluminum, raising the temperature of the refractory substantially higher than the melting points of both the glass and the aluminum, bringing an area of the latter into reacting contact with the former, and permitting the unit to cool to form a completed weld.

9. The described welded unit comprising a plurality of bodies, one consisting of a preformed hollow glass member, and the other of a preformed aluminum member and united thereto molecularly at adjacent surfaces.

10. The described welded unit comprising a plurality of bodies, consisting of a preformed hollow glass member, a preformed aluminum member united thereto molecularly at adjacent surfaces, and a porcelain member within the glass member, welded thereto and reinforcing the same.

JULIUS EDGAR LILIENFELD.